United States Patent
Bliss et al.

(10) Patent No.: US 7,907,359 B2
(45) Date of Patent: *Mar. 15, 2011

(54) FINITE FIELD BASED SHORT ERROR PROPAGATION MODULATION CODES

(75) Inventors: William G. Bliss, Thornton, CO (US); Razmik Karabed, San Jose, CA (US)

(73) Assignee: STMicroelectronics, Inc., Coppell, TX (US)

( * ) Notice: Subject to any disclaimer, the term of this patent is extended or adjusted under 35 U.S.C. 154(b) by 95 days.

This patent is subject to a terminal disclaimer.

(21) Appl. No.: 12/345,561

(22) Filed: Dec. 29, 2008

(65) Prior Publication Data

US 2009/0168620 A1    Jul. 2, 2009

Related U.S. Application Data

(62) Division of application No. 11/016,283, filed on Dec. 17, 2004, now Pat. No. 7,486,456.

(51) Int. Cl.
*G11B 5/02* (2006.01)
*G11B 20/06* (2006.01)
*G11B 20/08* (2006.01)
*G11B 5/09* (2006.01)
*G11B 15/52* (2006.01)
*G11B 19/02* (2006.01)
*G11B 20/00* (2006.01)

(52) U.S. Cl. .................. 360/29; 369/47.19; 714/758

(58) Field of Classification Search .................. None
See application file for complete search history.

(56) References Cited

U.S. PATENT DOCUMENTS

| 2003/0192007 A1 | 10/2003 | Miller et al. |
| 2004/0059980 A1 | 3/2004 | Bliss et al. |
| 2004/0059993 A1 | 3/2004 | Ashley et al. |
| 2006/0048038 A1 | 3/2006 | Yedidia et al. |

OTHER PUBLICATIONS

Wood, Roger et al., "Perpendicular Recording: The Promise and The Problems," JMMM, 2001, pp. 1-9, vol. 235.
European Search Report dated Mar. 15, 2006.

*Primary Examiner* — Daniell L Negrón
(74) *Attorney, Agent, or Firm* — David V. Carlson; Lisa K. Jorgenson

(57) ABSTRACT

The invention relates to a data modulation method applicable to make data streams tend to have desired properties, useful for clock recovery, making signals more distinguishable, or enforcing run-length conditions. A stream of input data and a corresponding stream of output data are grouped into elements of a finite field. Input elements of said input data are modified by a transform generating output elements of the output data, such that a current output element is a linear combination of a current input element and at least one previous output element. A multiplier applied to at least one previous output element is a non-zero and non-unity element of the finite field. A set of initial conditions inherent to the transform, is selected such that the output elements resulting from the transform tend to have the desired property.

22 Claims, 1 Drawing Sheet

FINITE FIELD BASED SHORT ERROR PROPAGATION MODULATION CODES

CROSS-REFERENCE TO RELATED APPLICATION

This application is a division that claims priority under 35 U.S.C. §120 to U.S. patent application Ser. No. 11/016,283, entitled "FINITE FIELD BASED SHORT ERROR PROPAGATION MODULATION CODES," filed Dec. 17, 2004 and issued as U.S. Pat. No. 7,486,456 on Feb. 3, 2009, assigned to the same assignee as the present application, and incorporated herein by reference in its entirety.

BACKGROUND OF THE INVENTION

1. Field of Invention

The present invention relates to modulation of data transfer signals, for instance in reading from, and writing to a magnetic medium, such as a hard disk drive. The invention more specifically relates to modulation intended to make the signal properties meet specific criteria, for instance enforcing run-length limited conditions, making signals more distinguishable (increasing "distance"), and providing clock recovery information.

2. Relevant Background

FIG. 1 is a schematic representation of a data transfer chain 8, such as used in a hard disk drive. A sequence of user data to be written on a hard-disk is input to an Error Correcting Coding (ECC) circuit 10. An encoder 12, implementing the desired modulation, receives k-bit blocks of output b from the ECC 10 and produces (k+r)-bit blocks c. The (k+r)-bit blocks c are referred to as codewords. The encoder 12 outputs the codeword c to a $1/(1+D^2)$ filter or precoder 14. The term "D" designates a one bit delay and "+" designates the bitwise exclusive OR operator. Thus, the i-th bit $x_i$ in a codeword output c by precoder 14 is expressed as $$x_i = c_i + x_{i-2}.$$

Such an operation needs two initial conditions $x_{-1}$ and $x_0$ to be set for x, for instance (0, 0).

Codeword x passes in a channel 16 through one or more channel filters 18. The channel, which is where the data is written to the hard-disk and read back from the hard-disk, is typically corrupted by additive noise n, such that the received sequence r is defined by r=z+n, where z is the output of filters 18.

Based on the received sequence r, a Viterbi detector 20, for example, generates a detected sequence x̂, which is a reproduction of the input x to the channel filters 18. Next, bits x̂ are filtered by a filter 22 which performs the function $(1+D^2)$ that is an inverse of the function performed by precoder 14, and generates g. The output g of the filter 22 is decoded by a decoder 24 to produce a decoded sequence d, which is a reproduction of the ECC output sequence b. An ECC decoder 26 receives the output sequence d and reestablishes the user input to ECC coder 10.

As mentioned above, the codewords used in the system have k+r bits, whereas the corresponding user data blocks have a lower number of bits k, whereby there is an efficiency loss. The efficiency of the encoder is called "rate" and it is defined as k/(k+r).

Known modulation techniques implemented by the encoder 12 strive to increase the rate and impose desired properties on the codeword. Often this makes each bit of a codeword depend on every bit of the incoming data block. Such techniques have the drawback of increasing "error propagation"—often one corrupted bit in a codeword would cause the loss of most of the bits in the resulting data block.

US published application 20040059980, incorporated herein by reference, discloses a modulation method for use in encoder 12, which has short error propagation while imposing desirable properties on the codewords.

The modulation has the following generic transform:

$$\frac{1}{f_0 + f_1 D + f_2 D^2 + f_3 D^3 + \ldots + f_r D^r}$$

where D is a one-bit delay and $f = (f_0, f_1, f_2 \ldots f_r)$ is a set of constant binary values, with $f_0 = f_r = 1$, characterizing the modulation scheme. In other words, given an i-th bit $b_i$ of a user data block, the i-th bit $a_s$ of the resulting codeword a is defined as:

$$a_i = b_i + f_1 a_{i-1} + f_2 a_{i-2} + \ldots + f_r a_{i-r},$$

where i varies from 1 to k.

This operation requires r initial conditions, one for each of bits $a_{1-r}$ to $a_0$. Since each initial condition is one bit, there are $2^r$ possible choices for a set of initial conditions.

In a first part of the modulation scheme, an intermediate codeword a is calculated as above from b with a set of initial conditions set to zero. Thus:

$$a_{1-r} = 0,$$

$$a_{2-r} = 0,$$

...

$$a_0 = 0,$$

$$a_1 = b_1,$$

$$a_2 = b_2 + f_1 a_1,$$

$$a_3 = b_3 + f_1 a_2 + f_2 a_1,$$

...

$$a_r = b_r + f_1 a_{r-1} + f_2 a_{r-2} + \ldots + f_{r-1} a_1,$$

$$a_{r+1} = b_{r+1} + f_1 a_r + f_2 a_{r-1} + \ldots + f_r a_1$$

...

$$a_k = b_k + f_1 a_{k-1} + f_2 a_{k-2} + \ldots + f_r a_{k-r},$$

In a second part of the modulation scheme, a set of initial conditions is selected for each codeword c to be generated, depending on a predefined map relating the initial conditions to a predefined set of values for the intermediate codeword a. For instance, if a is all 1s, all 01s or all 10s, use "initial conditions No. 1", otherwise use "initial conditions No. 2".

Once the set of initial conditions is selected, rather than recalculating the final codeword c by applying the above transform with the selected initial condition set, the effect t ($t_{1-r}, t_{2-r}, \ldots t_0, t_1, t_2, \ldots t_k$) of the initial condition set is simply added to the intermediate codeword a, i.e. c=a+t. The effect t is calculated by inserting the selected initial condition set in the above transform, and applying the transform to all variables b set to zero.

Of course, the zero initial conditions may also be selected, in which case the intermediate codeword a becomes the final codeword c.

An interesting property of this modulation technique is that these initial conditions may thus be changed from one codeword to the next without requiring the decoder to be reconfigured. This allows real-time setting of the initial conditions for each codeword so that each codeword may be made to have desired properties.

As an example with r=1 and $f_1$=1, there is one initial condition having two possible values: 0 or 1. For a same data block, switching the initial condition between 0 and 1 switches the resulting codeword to its complement. Therefore, it is certain that one choice of the initial condition will yield a majority of 1s in the resulting codeword. If this is a desired property, the map is such that if the 0 initial condition yields more 0s than 1s in the codeword, the 1 initial condition is selected, otherwise the 0 initial condition is selected. Producing a large number of 1s is often a desired property, because each 1 causes a transition in the signal when it passes through the precoder 14, which transition helps in recovering clock information at the other end of the channel.

Since each bit $c_i$ of a codeword c is calculated from r previous bits, corruption of one bit will corrupt r further bits, i.e. the error propagation length is r+1. Therefore, in practical applications, r will be chosen small, often equal to 1 or 2. Choosing r small also increases the rate of the encoder, equal to k/(k+r).

The above disclosed modulation technique provides satisfactory results for enhancing signal properties obeying linear laws, which is the case in the specifications for hard-disks with "longitudinal recording", i.e. having magnetic polarization that changes along the tracks of the disk.

Currently, some hard-disks tend to be of the "perpendicular recording" type, i.e. having magnetic polarization changes perpendicular to the disk. The signal specifications for such disks require the "charge" to tend to zero, and this preferably over small sequences of consecutive bits. The charge is defined as the sum of 1s and 0s written on the disk, where each 1 is summed as +1 and each 0 is summed as −1. In other words, the data recorded on the disk should tend to have as many 1s as 0s.

The zero charge requirement becomes an additional parameter to be taken into account in the modulation scheme. The known modulation schemes do not offer enough flexibility to address this problem.

What is needed, therefore, is a signal modulation scheme with enhanced flexibility, that can in particular make the charge tend to zero while satisfying other requirements in the properties of the signal.

SUMMARY OF THE INVENTION

According to the invention, this need is satisfied by a data modulation method comprising the steps of: grouping a stream of input data and a corresponding stream of output data into elements of a finite field; applying to input elements of the input data a transform generating output elements of the output data, such that a current output element is a linear combination of a current input element and at least one previous output element, wherein a multiplier applied to at least one previous output element is a non-zero and non-unity element of the finite field; and selecting a set of initial conditions inherent to the transform, such that the output elements resulting from the transform tend to have a desired property.

According to an embodiment of the invention, the method comprises the further the steps of: calculating intermediate elements by applying the transform to the input elements with a set of initial conditions of value zero; calculating the effect of the selected set of initial conditions by applying said transform to input elements having value zero and the selected set of initial conditions; and adding the effect to the intermediate elements to obtain the output elements.

According to an embodiment of the invention, the step of selecting the initial conditions comprises the steps of: defining distinct sets of initial conditions, each set having a single non-zero element at a distinct position; and selecting each non-zero element of the sets of initial conditions such that the output elements tend to have a respective property.

The invention also provides for a decoder or inverse data modulation method comprising the steps of: grouping a stream of input data and a corresponding stream of output data into elements of a finite field; and applying to the input elements of the input data a transform generating output elements of the output data, such that a current output element is a linear combination of a current input element and at least one previous input element, wherein a multiplier applied to a previous output element is a non-zero and non-unity element of the finite field.

BRIEF DESCRIPTION OF THE DRAWING

The invention is illustrated in the accompanying drawing, wherein.

DETAILED DESCRIPTION OF THE PREFERRED EMBODIMENTS

Figure 1:
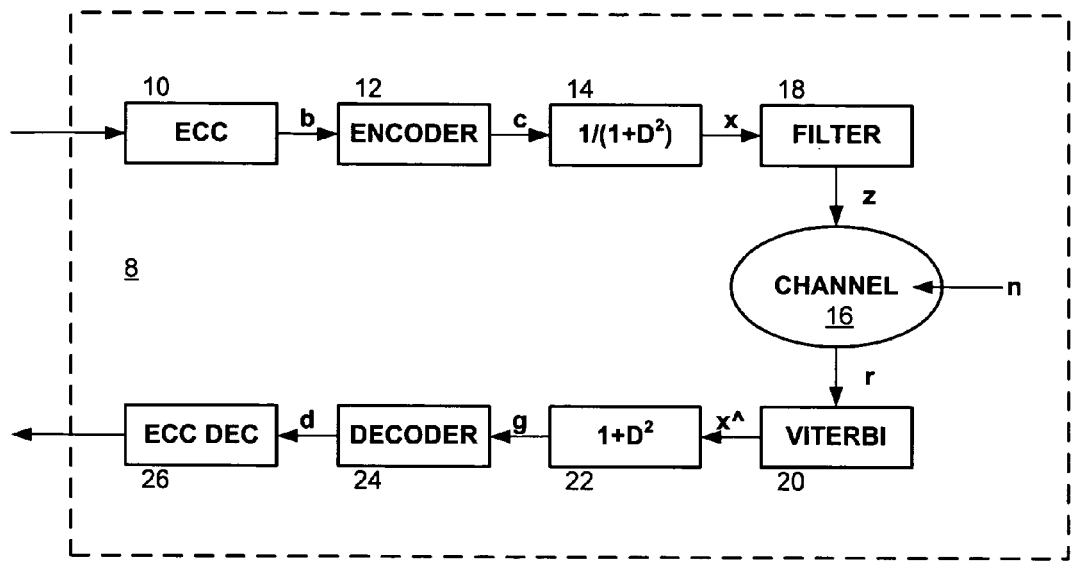
FIG. 1 illustrates a signal processing chain in which the present invention may be implemented.

In an embodiment of the invention, each user data block $B=(b_1, b_2, \ldots b_k)$ fed to the encoder 12 of the processing chain of FIG. 1 is subdivided into p=k/m m-tuples $B_1, B_2, \ldots B_p$. Each m-tuple $B_i$ is considered as an element of a finite field $GF(2^m)$. The modulation transform is expressed as:

$$\frac{1}{\alpha_0 + \alpha_1 D_m + \alpha_2 D_m^2 + \alpha_3 D_m^3 + \ldots + \alpha_r D_m^r}$$

where $D_m$ is a one m-tuple delay and $(\alpha_0, \alpha_1, \alpha_2, \ldots$ are constant elements of $GF(2^m)$, at least one of which is non-zero and non-unity. In other words, given an i-th m-tuple $B_i$ of a user data block $\underline{B}$, the i-th m-tuple $A_i$ of the resulting codeword $\underline{A}$ is defined as:

$A_i = \alpha_0 B_i + \alpha_1 A_{i-1} + \alpha_2 A_{i-2} + \ldots + \alpha_r A_{i-r}$, where i varies from 1 to p. Of course, all arithmetic is performed over finite field $GF(2^m)$.

Addition in a finite field is a bitwise exclusive OR operation. Multiplication is more complex: the two operands are multiplied under their polynomial representation, and the resulting polynomial, modulo the "generator polynomial" of the finite field, is the final result. Such multiplication introduces pseudo-random properties in the results, which contributes to enhanced flexibility of the modulation scheme according to embodiments of the invention.

The above transform requires r initial conditions in finite field $GF(2^m)$ for $A_{1-r}$ to $A_0$. Since each initial condition is an element of finite field $GF(2^m)$, there are $2^{mr}$ possible choices for a set of initial conditions.

In a generic use of the modulation scheme according to embodiments of the invention, a set of constants $\alpha=(\alpha_0, \alpha_1, \alpha_2, \ldots \alpha_r)$ is predefined. The corresponding decoder also uses this same set of constants. In operation, a set of initial conditions is found for each codeword being generated in order to make that codeword best match a set of required properties. The choice of the initial conditions does not affect the operation of the decoder, which is one of the interesting features of this type of modulation scheme.

The error propagation length of this modulation scheme is $rm+1$ bits, since one corrupted bit will affect r m-tuples.

In a preferred embodiment, the modulation scheme is used in two parts.

In a first part, an intermediate codeword $\underline{A}$ is calculated with the above transform from $\underline{B}$ with initial conditions set to zero. Thus:

$A_{1-r}=0$, $A_{2-r}=0$,

...

$A_0=0$, $A_1=\alpha_0 B_1$, $A_2=\alpha_0 B_2+\alpha_1 A_1$, $A_3=\alpha_0 B_3+\alpha_1 A_2+\alpha_2 A_1$,

...

$A_r=\alpha_0 B_r+\alpha_1 A_{r-1}+\alpha_2 A_{r-2}+\ldots+\alpha_{r-1}A_1$, $A_{r+1}=\alpha_0 B_{r+1}+\alpha_1 A_r+\alpha_2 A_{r-1}+\ldots+\alpha_r A_1$

...

$A_p=\alpha_0 B_p+\alpha_1 A_{p-1}+\alpha_2 A_{p-2}+\ldots+\alpha_r A_{p-r}$.

In a second part of the modulation scheme, a map M is defined that relates specific initial condition sets to specific criteria satisfied by the intermediate codeword $\underline{A}$. Once the set of initial conditions is selected, rather than recalculating the final codeword $\underline{C}$ by applying the above transform with the selected initial condition set, the effect T ($T_{1-r}, T_{2-r}, \ldots T_0, T_1, T_2, \ldots T_p$) of the initial condition set is simply added to the intermediate codeword $\underline{A}$, i.e. $\underline{C}=\underline{A}+\underline{T}$. This is possible, because the transform is linear. The effect T is calculated by inserting the selected initial condition set in the above transform, and applying the transform with input B set to zero.

The modulation scheme may be noted $ENC(\underline{\alpha}, M)(\underline{X})$, where $\underline{\alpha}$ represents the set of constants ($\alpha_0, \alpha_1, \alpha_2, \ldots \alpha_r$) used in the transform, $\underline{X}$ is the set of p m-tuples to which the transform is applied, and M designates the map that defines initial conditions used in calculating the current codeword. The result of $ENC(\underline{\alpha}, M)(\underline{X})$ is a set of $k+rm$ bits, or $r+p$ m-tuples or elements of $GF(2^m)$.

In one embodiment of the invention, instead of exploring all possible initial conditions, only $r+1$ predefined initial condition sets are used. Map M is thus characterized by $r+1$ submaps M0, M1, ... Mr, each associated to a respective one of the $r+1$ predefined initial condition sets. M0 is associated to initial conditions set to zero, and each of maps Mi, $i>0$, is associated to an initial condition set where all elements are zero, except the i-th, which is equal to unity, i.e. (0, 0, ... 0, 1, 0, ... 0), where 1 is at the i-th position.

Thus, the transform, applied to a user data block $\underline{B}$ will be expressed as:

$ENC(\underline{\alpha}, M)(\underline{B}) = ENC(\underline{\alpha}, M0)(\underline{B}) +$ $\beta_1 ENC(\underline{\alpha}, M1)(\underline{0}) + \beta_2 ENC(\underline{\alpha}, M2)(\underline{0}) + \ldots \beta_r ENC(\underline{\alpha}, Mr)(\underline{0})$ $ENC(\underline{\alpha}, M0)(\underline{B})$ designates the intermediate codeword $\underline{A}$, and all of the other terms represent the effect T of the initial conditions, wherein $\underline{\beta}=(\beta_1, \beta_2, \ldots \beta_r)$ designates a set of scaling factors in $GF(2^m)$ that will generally change for each codeword $\underline{A}$. In fact, map M is such that $\underline{\beta}=M(\underline{X})$, whatever the value of $\underline{X}$. The scaling factors $\beta$ could form part of their respective submaps, but the above notation allows to better visualize which parameters are adjustable and causes submaps M0, M1, ... Mr to be constant.

The inverse transform, i.e. the decoding operation performed by decoder 24, can be designated $DEC(\underline{\alpha})(\underline{Y})$. As previously mentioned, the map M does not intervene in the decoding operation. The decoder is such that:

$B_i = \alpha_0^{-1}(C_i+\alpha_1 C_{i-1}+\alpha_2+\ldots \alpha_r C_{i-r})$, where $B_i$ is an m-tuple output by the decoder and $C_i$ is an m-tuple currently input to the decoder.

The modulation scheme will be better understood through various examples illustrated below.

EXAMPLE 1

1. $p=14$
2. $r=1$
3. $m=4$
4. $(\alpha_0, \alpha_1)=(1, \mu)$, where $\mu$ is a non-zero and non-unity element of $GF(2^4)$
5. Map M1 specifies the use of the unity over $GF(2^4)$ as initial condition
6. $\beta_1$ is chosen such that it does not belong to $S=\{0, A_1\mu^{-1}, A_2\mu^{-2}, \ldots A_{14}\mu^{-14}\}$ (reason explained later). This is always possible, since $\beta_1$ has 16 possible distinct values, whereas S only has 15 elements.

In this example, intermediate codeword $\underline{A}=ENC(\underline{\alpha}, M0)(\underline{B})$, is expressed as:

$A_0=0$, $A_1=B_1$, $A_2=B_2+\mu B_1$, $A_3=B_3+\mu B_2+\mu^2 B_1$,

...

$A_{14}=B_{14}+\mu B_{13}+\ldots \mu^{13}B_1$,

The additive effect T of the initial conditions is $\beta_1 ENC(\underline{\alpha}, M1)(\underline{0})=\beta_1(1, \mu, \mu^2, \mu^3, \ldots \mu^{14})$. $\beta_1$ is chosen such that $T+\underline{A}$ has all 4-tuples non-zero, i.e. $\beta_1 \neq 0$, $\mu\beta_1 \neq A_1$, $\mu^2\beta_1 \neq A_2$, ... $\mu^{14}\beta_1 \neq A_{14}$. Hence the choice defined above in item 6.

With this choice, each 4-tuple of the final codeword $\underline{C}$ contains at least one bit at 1, which ensures that there is at least one transition in the signal every 4 bits at the output of precoder 14. This property promotes clock recovery.

The search for the desired value of $\beta_1$ requires at most 14 trials out of the 15 non-zero possible values. Each trial requires a comparison with each of the 14 last values of set S. If the $14^{th}$ trial is unsuccessful, it is certain that the value searched for is the $15^{th}$ non-zero value.

The decoder in this example is such that:

$B_i=C_i+\mu C_{i-1}$, where $B_i$ is an m-tuple output by the decoder and $C_i$ is an m-tuple currently input to the decoder.

EXAMPLE 2

1. p=6
2. r=1
3. m=2
4. $(\alpha_0, \alpha_1)=(1, \mu)$, where $\mu$ is a non-zero and non-unity element of $GF(2^2)$
5. Map M1 specifies the use of unity as initial condition. Let $Q=ENC(\alpha, M1)(0)=(1, \mu, \mu^2, \ldots \mu^6)$
6. $\beta_1$ is chosen such that $C=A+T=A+\beta_1 Q$ has the least charge. The charge of C is defined as $2[(-1)^{c_{-1}}+(-1)^{c_0}+(-1)^{c_1}+ \ldots (-1)^{c_{12}}]$, where $c_{-1}, c_0, c_1, \ldots c_{12}$ are the successive bits of codeword C. (This amounts to adding +1 for each bit at 1 and −1 for each bit at 0, and multiplying the final result by 2.)

The search for the required value of $\beta_1$ is particularly simple in this example, since there are only four values to try.

This exemplary modulation does not require a precoder 14 (nor the inverse precoder 22), since the codewords are short (12 bits) and the modulation inherently inserts transitions. Indeed, transitions are necessary to make the charge tend to zero.

In using this example in a simulation on random input data, the variance of the charge is about 1.74 over a significant number of consecutive codewords. This result is satisfactory for dealing with perpendicular recording hard-disks.

The decoder in this example is also such that:

$$B_i = C_i + \mu C_{i-1},$$

where $B_i$ is an m-tuple output by the decoder and $C_i$ is an m-tuple currently input to the decoder The efficiency of the modulation in reducing charge may be increased by increasing m and k, whereby there will be more values to try for $\beta_1$.

If several values of $\beta_1$ happen to reduce the charge, then preferably the one causing most transitions in codeword C is selected, whereby clock-recovery is also promoted. Alternatively, if a precoder 14 is present, the value causing C to have most is is selected instead.

If multiple properties are to be satisfied by the codewords, r may be chosen equal to the number of properties, whereby there will be as many factors $\beta$ to search for as desired properties. Factors $\beta$ will not be independent and it may be necessary to optimize them through several iterations, i.e. if an optimal first factor is found for a first property, a subsequently found optimal second factor for a second property may affect the optimality of the first factor, whereby the first factor is searched for again, which may in turn affect the optimality of the second factor. This may continue until a compromise is found for both factors.

Figure 2:
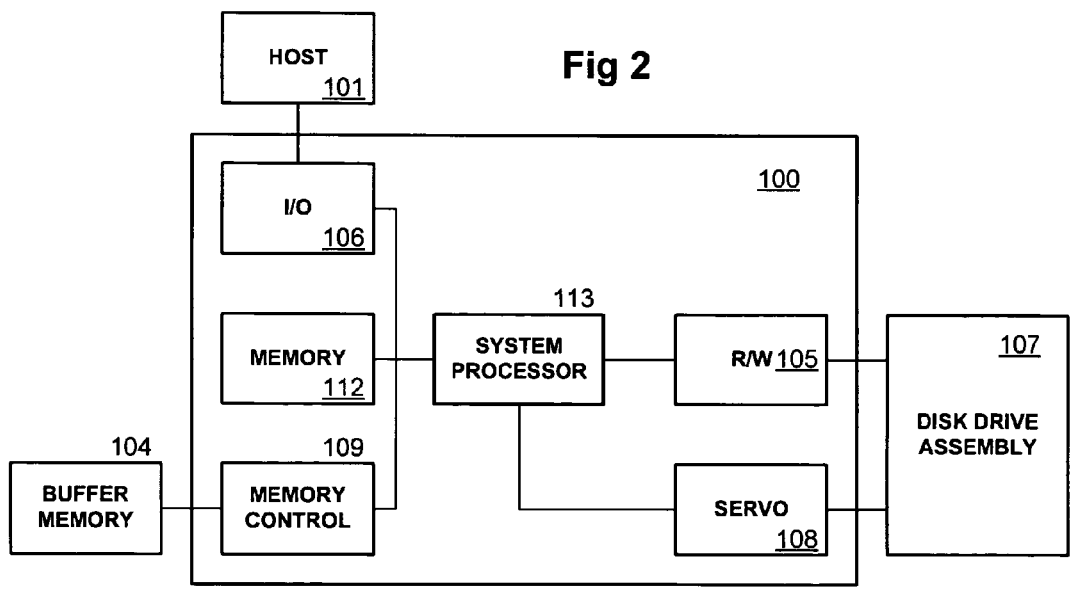
FIG. 2 schematically shows a disk drive system in which the signal processing chain of FIG. 1 may be included.

FIG. 2 illustrates in simplified form a disk drive system 100 in which the present invention may be embodied. Disk drive system 100 includes a system processor 113 that processes requests and commands from a host computer 101 that direct the drive system to perform specific behavior involving disk drive assembly 107. Examples include reading and writing data to disk drive assembly 107 through a read/write subsystem 105, providing state information such as defect tables, error status and the like. Disk controller unit 103 includes data processing capacity as well as memory in the form of ROM or RAM 112 and buffer memory 104 to generate responses to received commands and requests. The generated responses return data, state information and/or error codes depending on the particular operation being performed.

Disk drive assembly 107, e.g., an HDD system, implements physical mass storage typically on a plurality of magnetic disks and read/write head electronics for transferring data with the disks. Disk drive assembly 107 typically includes read channel hardware for preprocessing and amplifying data read from the magnetic media as well as a spin motor for spinning the disks and voice coil motor (VCM) for positioning the read/write head electronics at specific locations with respect to the disk surface(s).

A servo control 108 generates drive signals that control the VCM and/or spin motors. These drive signals are in the form of precision voltage or current signals that drive the motors directly.

Host 101 typically comprises a data processing device such as a personal computer, server, workstation or the like that requires access to bulk data storage capabilities of disk drive assembly 107. Host 101 sends write commands and data via controller 103 to write data onto the disks as well as read commands to retrieve previously written data from disks within disk drive assembly 107. On both read and write operations the data transmitted from the host 101 to the disk controller 103 includes an indication of a specific location or set of locations on the disk drive assembly that contains the data that is to be accessed.

The data that is exchanged through disk controller 103 is typically buffered in buffer memory 104 that is accessible via memory controller 109 and subsequently transmitted to disk assembly 107 or host 101. Buffer memory 104 is used to overcome differences between the speed at which host 101 operates as compared to the speed at which disk assembly 107 operates. In place of or in addition to buffer memory 104, a cache memory may be implemented by appropriate changes (e.g., tag management, hit/miss detection and the like) to memory controller 109.

The present invention may be implemented in hardware within the read/write subsystem 105, in software executed within the system processor 113, or in a combined hardware and software mode in processor 113 and subsystem 105.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A memory storage device comprising:
    a memory operable to electronically store information;
    a writing circuit configured to write information in the memory;
    a reading circuit configured to read information from the memory; and
    a read/write system operable to:
        group a stream of input data and a corresponding stream of output data into elements of a finite field;
        apply to input elements of the input data a transform to generate output elements of the output data, such that a current output element is a linear combination of a current input element and at least one previous output element, wherein a multiplier value applied to the at least one previous output element is a non-zero and non-unity element of the finite field; and
        select a set of initial conditions inherent to the transform, such that the output elements resulting from the transform tend to have a desired property.

2. The memory storage device of claim 1 wherein the read/write system is further operable to:
    calculate intermediate elements by applying the transform to the input elements with a set of initial conditions of value zero;

calculate the effect of the selected set of initial conditions by applying the transform to input elements having value zero and the selected set of initial conditions; and adding the effect to the intermediate elements to obtain the output elements.

3. The memory storage device of claim 1 wherein the read/write system is further operable to:

define distinct sets of initial conditions, each set having a single non-zero element at a distinct position; and select each non-zero element of the sets of initial conditions such that the output elements tend to have a respective property.

4. The memory storage device of claim 1 wherein the transform is such that a current output element is the sum of a current input element and $\mu$ times the preceding output element, wherein $\mu$ is a non-zero and non-unity element of the finite field.

5. The memory storage device of claim 1 wherein the initial conditions are selected such that each of the output elements is non-zero.

6. The memory storage device of claim 1 wherein the transform operates on groups of 14 input elements to produce groups of 15 output elements, and the finite field has 16 elements.

7. The memory storage device of claim 1 wherein the initial conditions are selected such that the output data tends to have as many "1s" as "0s" in the bits constituting the output data.

8. The memory storage device of claim 1 wherein the transform operates on groups of six input elements to produce groups of seven output elements, and the finite field has four elements.

9. The memory storage device of claim 1 wherein information is a collection of digital data bits.

10. An electronic memory apparatus comprising:
a plurality of memory cells;
a circuit arranged to read and write data from and to the memory cells, the circuit operable to:
group a stream of input data and a corresponding stream of output data into elements of a finite field; and
apply to input elements of the input data a transform generating output elements of the output data, such that a current output element is a linear combination of a current input element and at least one previous output element, wherein a multiplier value applied to the at least one previous output element is a non-zero and non-unity element of the finite field.

11. The electronic memory apparatus of claim 10 wherein the circuit arranged to read and write data from and to the memory cells is further operable to:
select a set of initial conditions inherent to the transform such that the output elements resulting from the transform tend to have a desired property.

12. The electronic apparatus of claim 11 wherein the circuit arranged to read and write data from and to the memory cells is further operable to:
calculate intermediate elements by applying the transform to the input elements with a set of initial conditions of value zero;
calculate the effect of the selected set of initial conditions by applying the transform to input elements having value zero and the selected set of initial conditions; and
adding the calculated effect to the intermediate elements to obtain the output elements.

13. The electronic memory apparatus of claim 10 wherein the circuit arranged to read and write data from and to the memory cells is further operable to:
define distinct sets of initial conditions, each set having a single non-zero element at a distinct position;
select each non-zero element of the sets of initial conditions such that the output elements tend to have a respective property.

14. The electronic memory apparatus of claim 10 wherein the initial conditions are selected such that each of the output elements is non-zero.

15. The electronic memory apparatus of claim 10 wherein the initial conditions are selected such that the output data tends to have as many 1's as 0's in the bits constituting the output data.

16. A memory storage device comprising:
an input interface operable to accept an input data stream;
an encoder configured to modulate the input data stream such that user data blocks of the input data stream and corresponding blocks of output data are grouped into a finite field, a transform is applied to the input elements to generate output elements wherein a current output element is a linear combination of a current input element and at least one previous output element, and wherein a multiplier value applied to the at least one previous output element is a non-zero and non-unity element of the finite field; and
a channel operable to store the modulated data stream.

17. The memory storage device of claim 16 wherein the encoder is further configured such that a set of initial conditions inherent to the transform are selected, such that the output elements resulting from the transform tend to have as many "1s" as "0s" in the bits constituting the output elements.

18. The memory storage device of claim 17, further comprising:
an input filter stage coupled to the encoder wherein the input filter stage is a $1/(1+D^2)$ precoder in which "D" is a one bit delay and "+" is a bitwise exclusive OR operator, the input filter stage operable to filter the modulated data stream to produce a filtered modulated data stream of bits from corresponding bits delayed.

19. The memory storage device of claim 17, further comprising:
an error correcting coding (ECC) circuit coupled between the input interface and the encoder and operable to produce a corrected data stream from the input data stream.

20. The memory storage device of claim 18, further comprising:
at least one output filter stage that is operable to perform a filter operation that is inverse to the input filter stage;
a decoder configured to demodulate a data stream and operable to produce an output data stream representative of the input data stream.

21. The memory storage device of claim 20 wherein the at least one output filter stage is a $(1+D^2)$ filter in which "D" is a one bit delay and "+" is a bitwise exclusive OR operator, the filter operable to produce a bit stream from corresponding bits delayed.

22. The memory storage device of claim 21, further comprising:
a Viterbi detector coupled between the channel and the at least one output filter stage.

* * * * *